Figure 1:
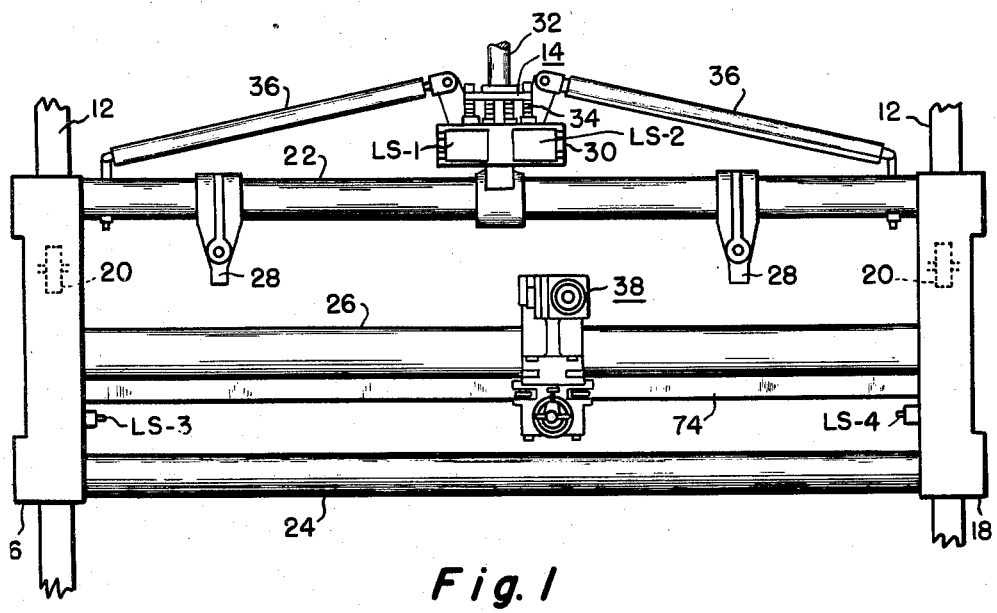

July 5, 1960 — T. A. INSOLIO — 2,943,393
GLASS CUTTER TROLLEY UNIT
Filed May 31, 1957 — 5 Sheets-Sheet 1

INVENTOR.
Thomas A. Insolio
BY Webb, Mackey & Burden
HIS ATTORNEYS

July 5, 1960

T. A. INSOLIO 2,943,393

GLASS CUTTER TROLLEY UNIT

Filed May 31, 1957

5 Sheets-Sheet 2

INVENTOR.
Thomas A. Insolio
BY Webb, Mackey
& Burden
HIS ATTORNEYS

July 5, 1960 T. A. INSOLIO 2,943,393
GLASS CUTTER TROLLEY UNIT
Filed May 31, 1957 5 Sheets-Sheet 3

INVENTOR.
Thomas A. Insolio
BY Webb, Mackey & Burden
HIS ATTORNEYS

July 5, 1960
T. A. INSOLIO
2,943,393
GLASS CUTTER TROLLEY UNIT
Filed May 31, 1957
5 Sheets-Sheet 4
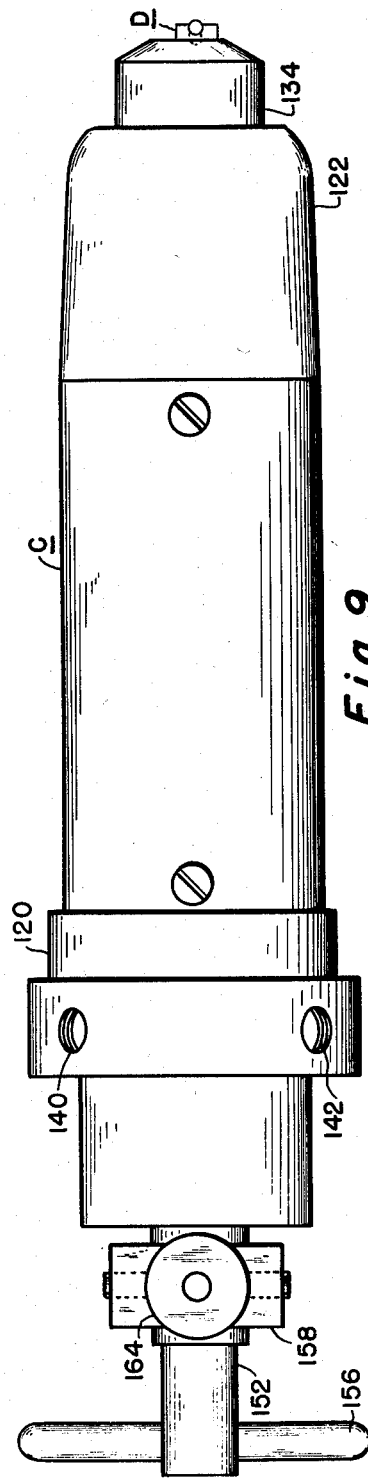
Fig. 9
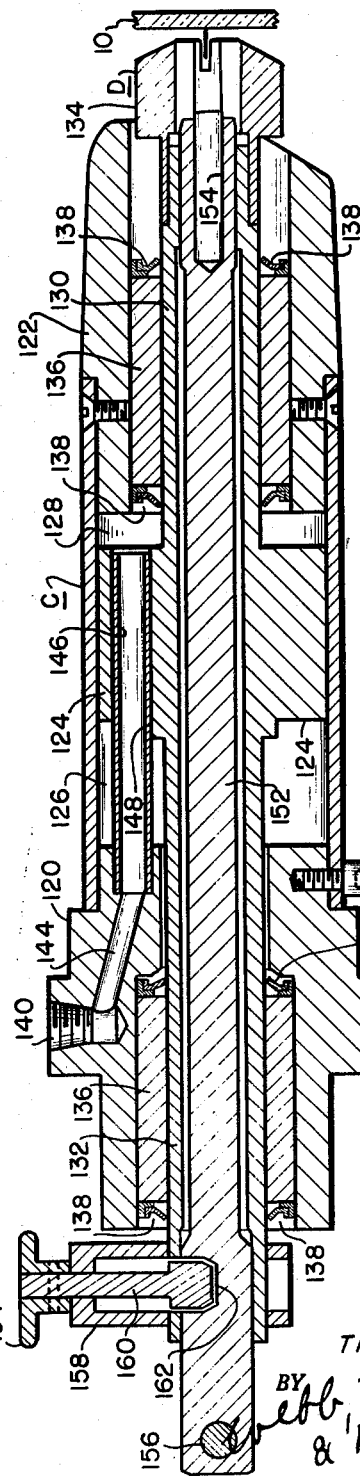
Fig. 10
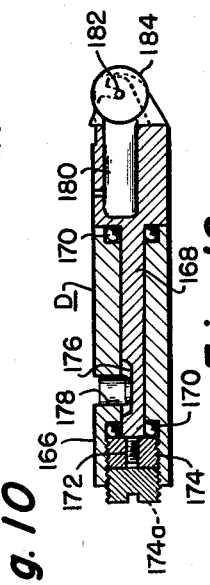
Fig. 12
Fig. 11
INVENTOR.
Thomas A. Insolio
BY *Webb, Mackey*
*& Burden*
HIS ATTORNEYS July 5, 1960 T. A. INSOLIO 2,943,393
GLASS CUTTER TROLLEY UNIT
Filed May 31, 1957 5 Sheets-Sheet 5

INVENTOR.
Thomas A. Insolio
BY Webb, Mackey & Burden
HIS ATTORNEYS

United States Patent Office 2,943,393
Patented July 5, 1960

2,943,393
GLASS CUTTER TROLLEY UNIT

Thomas A. Insolio, Jeannette, Pa., assignor to American Window Glass Company, Pittsburgh, Pa., a corporation of Pennsylvania Filed May 31, 1957, Ser. No. 662,831

18 Claims. (Cl. 33—32)

The present application relates to a glass cutter trolley unit, particularly a self-propelled unit for use in automatic glass cut-off machines.

The invention according to this application is primarily adapted for glass cut-off machines of the type generally as shown in Klages U.S. Patent 2,650,430. It is particularly suited to the automatic operation contemplated in such machines, involving a two-stroke cycle for the cutter so as to move it through a full cutting stroke constituting half a cycle and retracting the cutter in a return stroke to complete that cycle and prepare for the next. Briefly, glass cutting machines of this general type include a cage adapted for vertical movement alongside a rising sheet of glass, a cutter trolley on that cage which moves transversely across the glass sheet, and a glass measuring stop carried by the cage which contacts the advancing edge of the sheet. The cage is raised by chains connected to it and passing over sprockets on a cage lift shaft located adjacent the top of the machine. That cage lift shaft is driven from a set of conveyor rolls which move the glass sheet upwardly. In use, the cage which carries the transversely movable cutter moves at the same speed as the rising glass sheet to eliminate relative shift of the cutter lengthwise on the glass in order that an accurate cut can be made exactly at right angles to the direction of movement of the sheet. Particular difficulties are encountered in this specific task of holding the cutter relatively immovable to the moving sheet in the lengthwise respect, but freely movable crosswise thereof. Deflection of the track on which the cutter moves can cause variations in the score line which it strikes and also a warped glass sheet being scored can cause these same variations. In addition, in the direction normal to the plane of the sheet, the cutter sometimes tends to bounce and skip leaving holidays and a general waviness in the cut for this reason and others.

The present invention eliminates or materially reduces the foregoing difficulties by providing for application of cutter pressure in two stages so as to take up all slack and then begin the cut thereby to avoid wheel bounce; by providing a deep section modulus to the cutter track which eliminates deflection thereof and also takes out the reaction of torsional forces caused by the cutting pressure on the glass; and also by providing a double acting cutter cylinder which is instantaneously responsive in its action and which produces the described two-stage application of cutting pressure. This invention further provides a self-propelled action to the cutter trolley which, even so, produces only a slip clutch connection with a light traction drive so as to readily transform to a freely spinning ineffective propulsive effort which slips whenever the cutter meets with more than normal resistance by the glass. It is evident that unusual resistance occurs in case the cutter wheel penetrates the pane of the glass and thereafter meets the broken away edges broadside with a tendency either to stop the cutter in the desired fashion or produce the unwanted result of breaking out the remainder of the glass sheet if under positive geared traction in view of the evident advantages of an overload limiting connection as above indicated. High traction is therefore not only unnecessary, but undesirable.

As above indicated, this invention primarily is suited to the automatic operation of the Klages type glass cutting machines. The cutter structure is uniquely self-sufficient, however, complete with captive propulsion motor and cutter cylinder thereon provided and, therefore, it has broad application and, if desired, is readily applicable for instance, to horizontal cutting and glass scoring apparatus.

Figure 2:
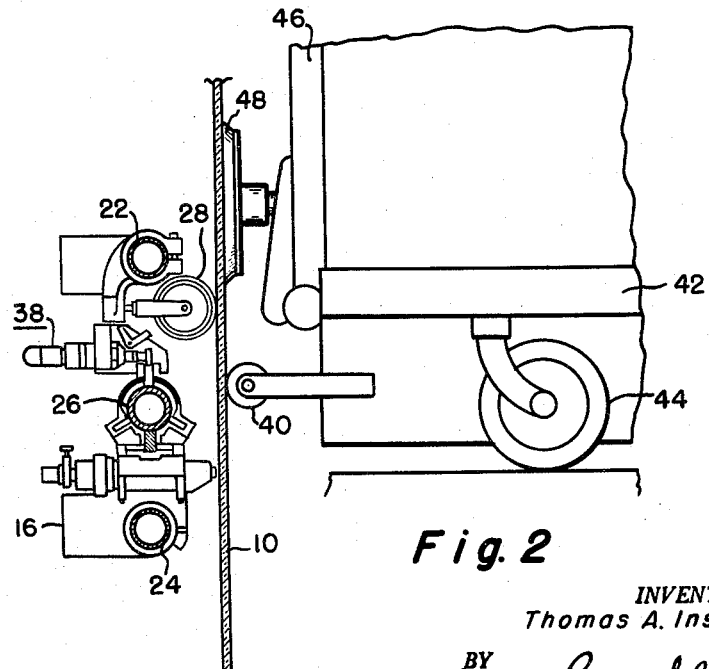
Figure 3:
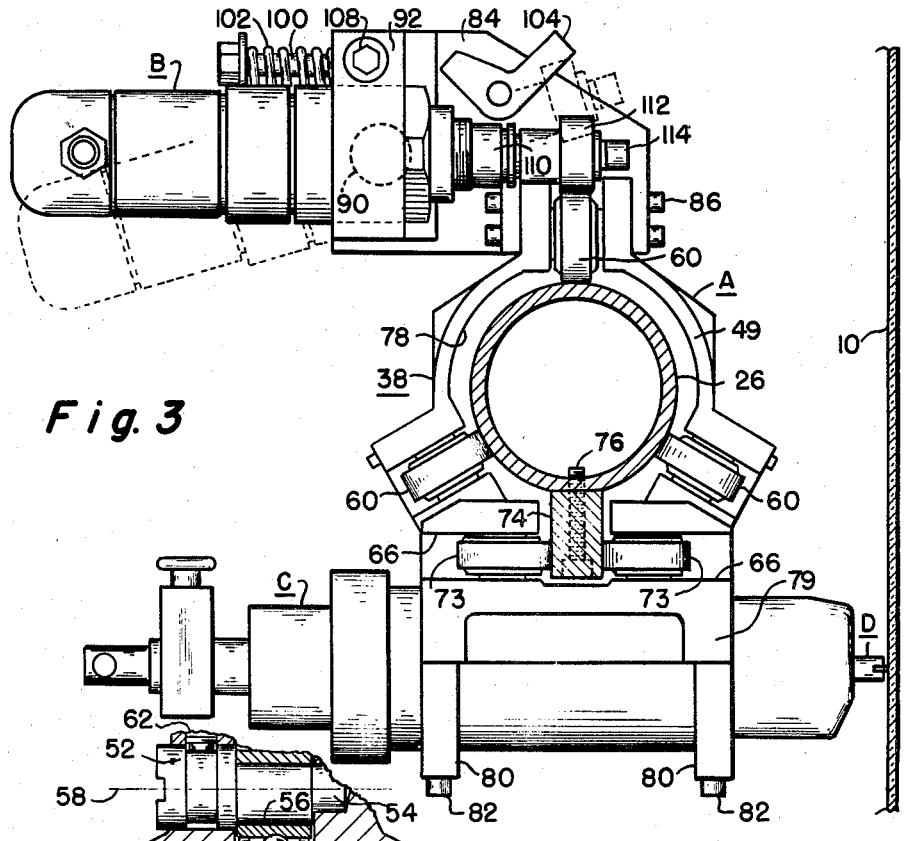
Figure 4:
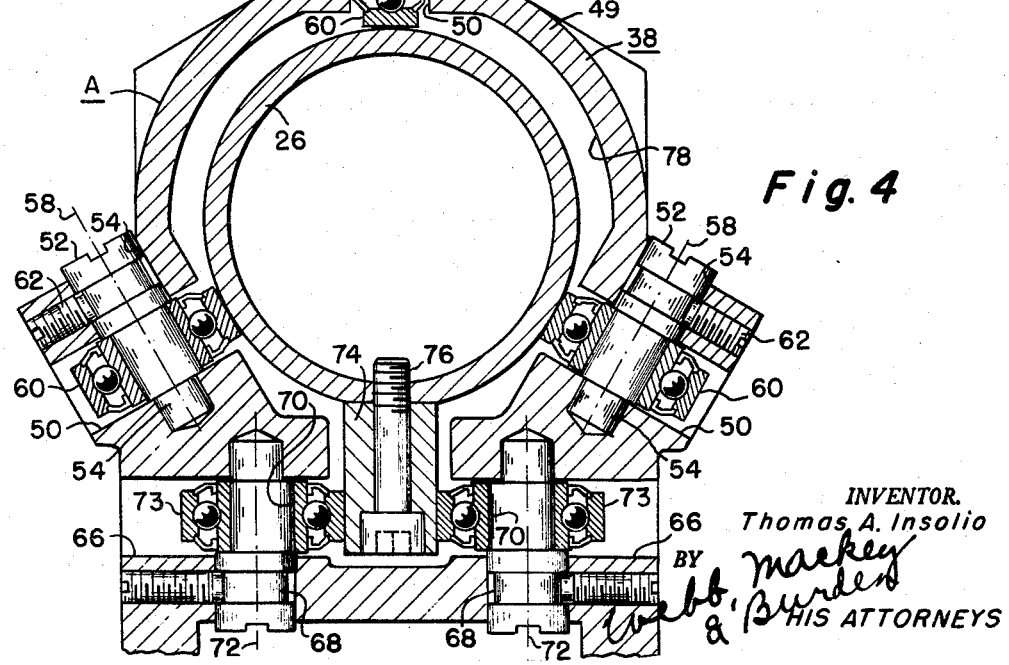
Figure 5:
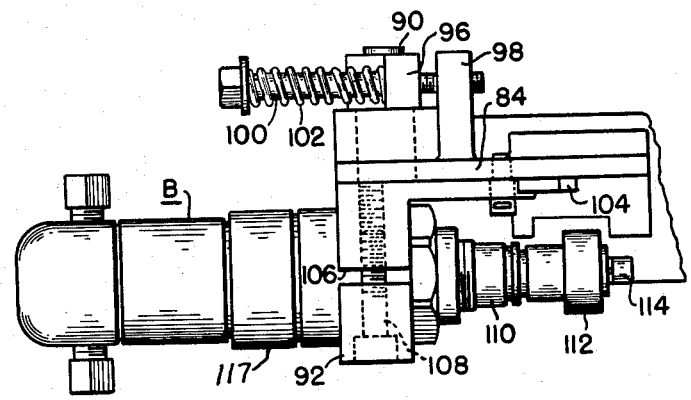
Figure 6:
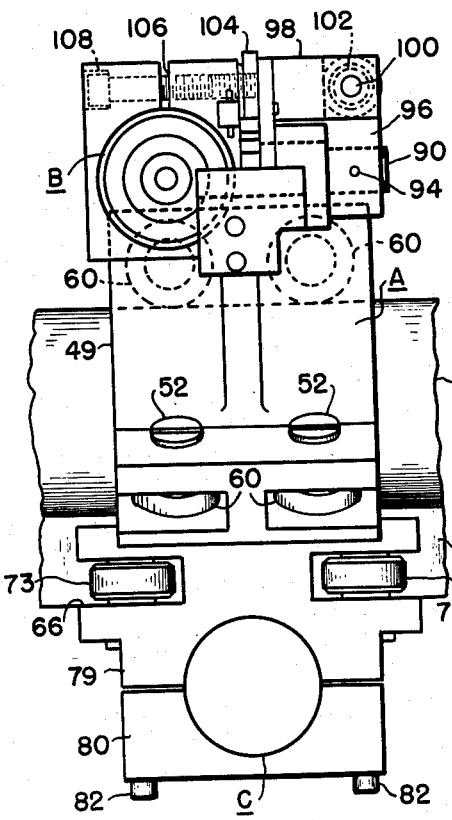
Figure 7:
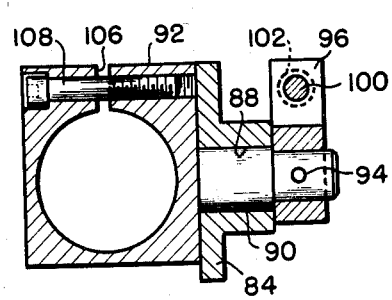
Figure 8:
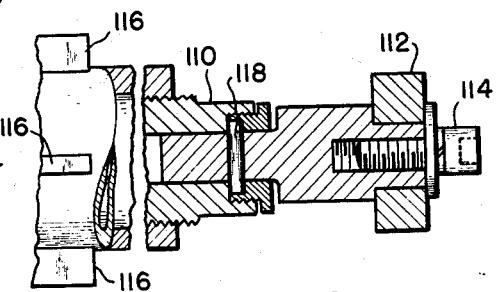
Figure 13:
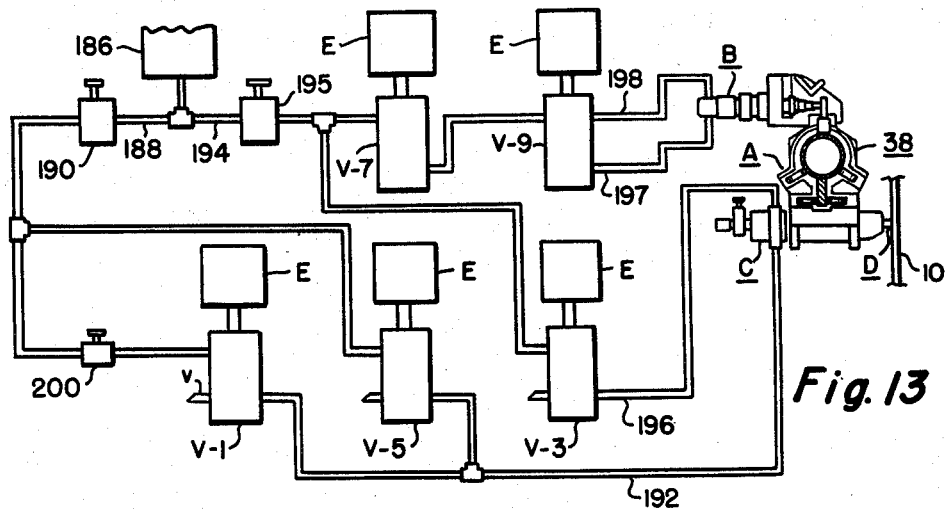
Figure 14:
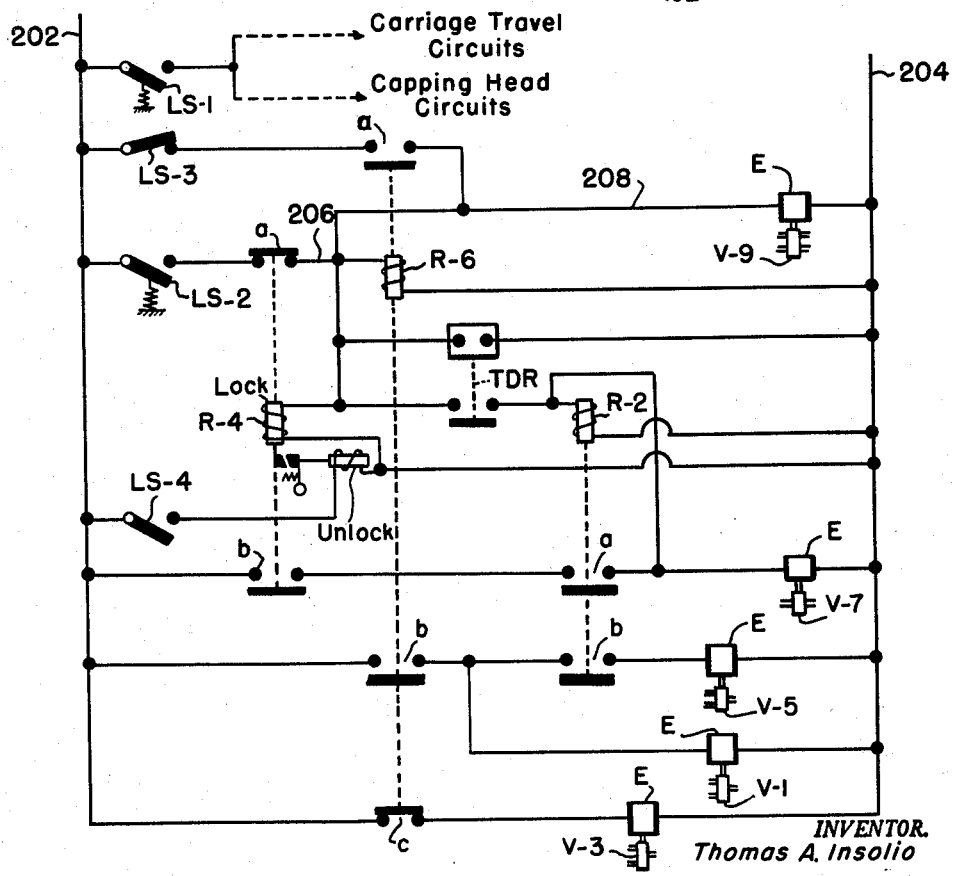

In the accompanying drawings which illustrate a preferred embodiment of the invention;

Figure 1 is a front elevation of a glass cutting machine embodying the present improvement, Figure 2 is a side elevation thereof, Figure 3 corresponds to Figure 2, but showing only the cutter component thereof to enlarged scale in side elevation, Figure 4 is a further enlarged view of the trolley portion of Figure 3, likewise in side elevation, but with certain parts broken away for clarity, Figure 5 is a top plan view of the entire cutter component of Figure 3, Figure 6 is a front elevation, Figure 7 is a view of a portion of Figure 6 to the same scale, but partly broken away for clarity, and Figure 8 is an enlarged view of a portion of Figure 5 with parts broken away for the sake of clarity, Figures 9 and 10 are top plan and longitudinal elevational views of another portion of Figure 3 to enlarged scale, Figure 11 is a fragmentary view corresponding to Figure 10, but in another plane, Figure 12 is an enlarged sectional view in top plan of a portion of Figure 9, Figure 13 is a schematic showing of the pneumatic system for the machine, and Figure 14 is a schematic diagram showing the electrical wiring system.

In Figures 1 and 2 of the drawings a glass sheet 10 is moved upwardly in a vertical direction by means of the conveying rolls of Fourcault apparatus, not shown, and after being delivered thereby, the parent sheet of glass is adapted to be subdivided by being cut or scored transversely of its direction of movement. For this purpose a glass cutting machine is provided having a parallel pair of upright side rails 12 to which there is mounted a cage 14. The cage includes two end brackets 16 and 18 having one or more rollers 20 which roll in slots formed in the side rails 12. The cage 14 further includes a horizontally extending pair of upper and lower tubular members 22, 24 which are connected at their opposite ends to the brackets 16, 18. A horizontally extending monorail 26 intermediate the upper and lower tubular members is similarly connected at each end to the bracket 16 or 18 at that end. The upper one of the tubular members 22 carries a pair of glass engaging rollers 28 at points spaced from its opposite ends and at the midportion it supports a measuring head 30 which carries a vertically extending measuring tube 32 through a lost motion connection 34. A pair of oppositely directed tie rods 36 steadies the measuring head 30 to form a trusswork therefor in cooperation with the upper tubular member 22. The measuring tube 32 carries a glass measuring stop, not shown, after the general manner of the machine in the noted Klages Patent 2,650,430 so as to operate the lost motion connection 34 and actuate two limit switches including a limit switch LS–1 and LS–2 mounted to the measuring head 30. The limit switches LS–1 and LS–2 are adjusted to close and activate a cutting cycle toward the last part of the stroke of the measuring tube 32 upwardly, the tube 32 holding the switches closed for the better part of the entire cycle and then opening the switches LS–1 and LS–2 preparatory to starting the next cycle. A cutter trolley 38 is mounted to shift as a unit on the track defined by the monorail 26 which has, associated with its opposite ends, a pair of limit switches LS–3 and LS–4 which are mounted to the respective end brackets 16, 18 in the path of movement of the trolley 38.

In a manner hereinafter more fully described, the cutter trolley 38 executes a two-stroke cycle travelling from the limit switch LS–4 to the limit switch LS–3 and back, so as to score the rising parent glass sheet 10 and provide a break line. The scored line thereafter transfers upwardly with the moving sheet to a point opposite a break-off roller 40 carried by a glass break-off machine 42 of the type generally as shown in my copending application, Serial No. 518,731, filed June 29, 1955. The break-off machine 42 is more completely described in that application, but in general it is portably mounted on a set of caster wheels 44 and carries a swingable frame 46 supporting a set of gripper cups 48. Under vacuum action these gripper cups grip the sheet of glass to bend it clockwise as viewed in Figure 2 about the break-off roller 40 so as to snap the glass along a clean parting line delineated by the score of the cutter carried by the trolley 38.

In Figures 3 and 4 the cutter trolley unit 38 essentially includes a wheeled trolley A, a double acting pneumatic propulsion motor B mounted thereto at the top and a double acting pneumatic cutting cylinder C and a wheel post assembly D which are mounted to the lower portion of the trolley for movement therewith along the monorail 26, the latter being primarily tubular or circular in cross section (may have other section). More specifically, the wheeled trolley A has a frame 49 formed from a one-piece casting which is provided with a set of three radial wheel slots 50 at each end, each slot being spaced at 120° from the others in the set so as to provide an uppermost slot and two intermediate slots 50. Each slot 50 has a wheel axle 52 crosswise thereof and provided with portions 54 which are concentric with one another and also the upper axle has one portion 56 which is eccentric relative to the axle axis 58. Each axle carries a ball bearing roller 60 engageable with the circular surface of the monorail 26 and these axles are each securely locked by means of a bind screw 62. Release of the bind screw 62 holding the upper axle 52 enables it to be rotated with the eccentric portion 56 thereof shifting the roller 60 so as to tighten it solidly in engagement with the monorail 26 thereby rendering all rollers snug and the carriage frame 49 concentric to the monorail.

The trolley frame 49 has another set of two wheel-slots 66 at each end and each provided with an axle 68 having concentric and eccentric portions 70 relative to the axis 72 thereof. The eccentric portions 70 of each axle carry ball bearing rollers 73 on adjustable axes in positive engagement with a radially depending rail extension 74 on the lower side of the monorail 26. This extension rail 74 is bolted at 76 at suitable spaced points to the monorail so as to reinforce it longitudinally and also to eliminate the torsional forces of reaction of the trolley A on that rail.

The trolley frame 49 will be noted to have an internal opening 78 which receives the monorail 26 and surrounds the same when the trolley and monorail are assembled together initially. Thereafter the upper roller axle 52 at one end is rotated about its longitudinal axis 58 so as to swing the eccentric portion 56 and tighten the roller 60 snugly into engagement with the circular portion of the rail 26. Thereafter the set of two axles 68 at that end is adjusted so that their individual eccentric portions 70 clamp the rollers 73 firmly against the rail extension 74 at opposite sides and in a manner to hold the trolley frame 49 fixed in the vertical plane of the extension 74 so as to be exactly erect in addition to being concentric to the monorail 26. The same adjustment is made on the rollers at the opposite end of the trolley frame 49 in the other set of three slots 50 and in the companion set of two slots 66. The adjustment of the rollers 60 in their sets of three slots at the opposite ends of the frame 49 insure that the frame is exactly concentric to the longitudinal axis of the monorail 26 so as to establish an accurately held longitudinal cutter path. The adjustment of the other rollers 73 insures an exactly maintained horizontal cutting plane for the wheel post assembly D.

The lower portion of the trolley frame 49 has a pair of spaced flange brackets 79 to which a pair of clamping saddles 80 is secured by means of a set of suitable bolts 82. This pair of clamping saddles 80 clamps the double acting pneumatic cutting cylinder C to the frame 49 and when this frame 49 is exactly vertical, the cylinder C is exactly horizontal and normal to the surface of the glass 10. It is essential that this normalcy be maintained for accurate cutting of the glass.

In Figures 3 and 5–8 the trolley frame 49 carries a transverse vertical plate 84 bolted at 86 to its upper portion. The vertical plate 84 has a horizontal trunnion bearing opening 88 therethrough receiving the midportion of a motor mounting trunnion 90 which at one end fixedly carries a motor mounting bracket 92. At the opposite end the trunnion 90 is pinned at 94 through the hub of a short upstanding lever 96. A transverse lug 98 is carried by the plate 84 at a point adjacent a forked portion of the lever 96 and a bolt 100 threads into this lug in a manner whereby the forked portion of the lever 96 straddles the bolt. A helical return spring 102 surrounds the bolt 100 so as to seat at one end against the head of the bolt and to thrust at the opposite end against the lever 96 to clamp it in a direction against the lug 98. A retracting latch 104 pivoted to the plate 84 is operated by hand to engage the motor mounting bracket 92 in a manner to rotate it counterclockwise as viewed in Figure 3 about the trunnion 90 against the opposition of the helical spring 102. The motor mounting bracket 92 is split in a yoke formation at 106 for encircling and adjustably clamping the pneumatic double acting propulsion motor B therein and has an adjustable bolt 108 carried thereby for this clamping purpose.

The propulsion motor B has a reversible rotor shaft 110 which carries at the outer end thereof a fiber friction wheel 112 which is firmly secured by means of a retainer bolt 114. At the inner end within the motor B the rotor shaft 110 carries a series of four vanes 116 which are pressurized alternately from the opposite sides of the motor B to drive the shaft 110 in the selected direction. Intermediate its ends, the shaft includes a detachable pin connection 118 to detachably hold component parts thereof together. In use, the coil spring 102 forces the lever 96 clockwise about the trunnion axis 90, Figure 3, so as to pivot the motor B on the axis of the mounting trunnion 90 and urge the friction wheel 112 lightly into line contact with the surface of the upper roller 60 of one end of the trolley frame 49. This light frictional contact of wheel 112 in backed-up relationship to the roller 60 provides a slip clutch connection under the necessary light traction to move the cutter trolley A against the few ounces of cutting resistance which the cutter on the glass produces. Slight further resistance is sufficient overload to slip the effective clutch connection of the friction wheel 112 making it spin ineffectively on its spin axis despite the tractive pressure that the spring 102 provides, which although light, is essentially uniform for all adjustments of the upper roller 60. Operation of the retracting latch holds the propulsion motor B and the wheel 112 with its spin axis in a position ineffective to drive the trolley A.

In Figures 9–11, the double acting pneumatic cutter cylinder C is shown in assembled relation with the wheel post assembly D which it carries. The cutter cylinder C has a closure means or head 120 screw-connected thereto at the outer end relative to the glass 10 and further has an inner closure means or head 122 which is also solidly screw-connected thereto. A hollow centered slidable piston 124 disposed between these closure heads divides the space therebetween into a pair of working chambers 126 and 128. At its opposite sides the piston 124 carries a pair of respective hollow inner and outer piston rod portions 130 and 132, the inner one of which carries a cutter guard 134 pressed thereon. The piston rod portions 130 and 132 extend throuh suitable bearings 136 in the respective end closure head to which they are sealed by means of a set of leather seals 138. The outer closure head 120 has a pair of laterally staggered air ports 140 and 142 which are internally threaded to receive air hose fittings. The port 140 is suitably connected through an internal passage 144 in the outer closure head 120 to the hollow interior of a fixed tube element 146 which is anchored in the closure head by having one end press fitted into a socket therein. The opposite end of the element 146 passes through a concentric guide opening 148 formed in the piston 124 eccentrically to its hollow center so as to prevent the piston form rotating about its axis. The hollow interior of the element 146 carries compressed air to and vented air from the working chamber 128 so as to apply the necessary pressure force differential at that side of the piston.

The other air port 142 communicates through an internal passage 150 in the outer closure head 120 so as to connect with the working chamber 126 and pressurize and vent that side of the piston 124 to move it. The hollow centered piston 124 and the piston rod portions 130 and 132 carry a longitudinal insert in their interior consisting of a cutting tool holder 152 which at one end is recessed with a socket 154 to carry the wheel post assembly D at a point within the guard 134 and accessible to the glass sheet 10. At the opposite end the holder 152 carries a cross pin 156 for use in manually withdrawing it through the piston rod portions 130, 132. A latching plate 158 fast to the outer end of the outer rod portion 132 slidably supports a spring pressed plunger 160 which sockets itself in a transverse bore 162 in the holder 152. A pull knob 164 is used to withdraw the plunger to permit the holder 152 to be withdrawn from its internal position and exposed outside the piston rod portions 130, 132 for substitution of a cutter.

In Figure 12, the wheel post assembly D socketed in the cutting tool holder 152 includes a cutting tool sleeve 166 in which a wheel post 168 is swiveled by means of spaced circular rows of ball bearing elements 170. The wheel post 168 has a reduced and threaded end portion 172 onto which a retaining nut is started at 174a and threaded into a solid line position shown at 174 in Figure 12 so as to tighten the bearing elements 170 in their respective rows. Adjacent the reduced end portion 172 and at a point between the bearings 170, the wheel post 168 has a flat portion 176, engaged by a pin stop 178 which is press fitted in an opening through the side of the sleeve 166. The stop 178 engages the flat portion 176 in a preselected manner to limit the caster or swiveling action of the wheel post 168 to 5° angularity on either side of the neutral longitudinal plane thereof which is horizontally disposed. The wheel post 168 has an enlarged slightly offset portion at the outer end to firmly hold a sheet metal clip insert 180 having spaced slots formed therein to receive and lock therein the opposite ends of an axle 182 for a cutter wheel 184. Owing to the limited caster movement in the swivel connection afforded by the wheel post 168, the cutter wheel axle 182 is therefore limited to a minor angle of swivel movement in vertical planes in its operation toward and upon the glass 10. Therefore there is little caster effect to be overcome on initial contact with the glass inasmuch as the wheel 184 is substantially in a horizontal plane at all times. This relationship is maintained through the inflexible connection of the tube element 146 and guide opening 148 and the very limited amount of movement in the connection between the stop 178 and the flat portion 176 on the wheel post 168.

In Figure 13 a compressed air source 186 constituting a compressor or a storage tank is shown pneumatically connected to the propulsion and cutter devices B, C on the cutter trolley 38 so as to pressurize the double acting power units thereon. The compressed air source 186 has an outlet which is split into a first branch 188 and thence connected through an air pressure regulator 190 to a pair of solenoid valves V1 and V5. Each solenoid valve V1 and V5 includes an electromagnetic coil E and they are connected in parallel with one another so as to feed a common flexible hose 192 which is connected to one or the other of the air ports 140, 142, not shown, on the cutter cylinder C. A second branch 194 connects the source of compressed air 186 through an air pressure regulator 195 to a pair of solenoid valves V3 and V7, each having an electromagnetic coil E to control the same. The solenoid valve V3 is a retracting valve connected through a flexible hose 196 to another one of the air ports 140, 142, not shown, on the cutter cylinder C. A reversing solenoid valve V9 is included in series with the valve V7 and supplies a pair of flexible air hoses 197, 198 which are selectively pressurized and vented or vice versa with compressed air to control the opposite sides of the propulsion motor B so as to drive the cutter trolley 38 in one direction or the opposite direction.

More specifically, the regulator 190 is set to deliver cutting air under pressure of approximately 4 p.s.i. to the solenoid valves V1 and V5, the valve V1 normally venting the hose 192 to atmosphere through a vent v and the valve V5 being normally closed. A restriction is interposed in the connection between the split first branch 188 and the valve V1 and as illustrated, this restriction consists of a needle valve 200 which is adjusted for delivering air in limited quantities to the valve V1 to delay build-up of cutting pressure to at least approximately two seconds before it reaches the full 4 p.s.i. cutting pressure. The regulator 195 is set to deliver pressure at approximately 70 p.s.i. to the valve V7 which pressurizes the propulsion motor B and to the retracting valve V3 which applies retracting air to the cutting cylinder C.

In use, on the assumption that the cutter trolley 38 occupies its initial starting position, the coil E of the solenoid valve V1 is energized so as to introduce air into the flexible hose 192 in limited quantities as it restrictively passes through the needle valve 200. The double acting cutter cylinder C immediately begins to advance the wheel post D into gentle engagement with the glass 10. After approximately a 2-second time delay measured from energization of the solenoid valve V1, the coil E on the solenoid valve V5 is energized to open the flexible hose 192 unrestrictedly to full cutting air pressure whereupon to insure that the wheel post D is placed under the desired 10 pounds total thrust (4 p.s.i.) against the glass 10 for a cutting stroke. Simultaneously, the coil E controlling the solenoid valve V7 is energized and the already energized valve V9 cooperates therewith to deliver a full 70 pounds per square inch propulsion air pressure to the propulsion motor B on the appropriate side thereof producing forward motion. The trolley 38 completes the cutting stroke half of its cycle whereupon the respective valves V1, V5 and reversing valve V9 are simultaneously deenergized and concurrently the retracting valve V3 is energized. The retracting valve V3 cooperates with the valves V1 and V5 in respectively applying pressure to the opposite working chamber in the cutter cylinder C and depressurizing and venting the initially pressurized side so as to retract the wheel post assembly D from the glass 10. Reversal of the direction of the stream of air in the flexible hoses 197 and 198 due to deenergization of the reversing valve V9 causes the propulsion motor drive B of the trolley 38 to complete the non-cutting stroke so as to finish the last half cycle of the operation. The cycle is then repeated.

It will be noted that air is applied to the cutter cylinder C in three stages of operation, no one of which affords the same pressure. That is to say, initial low pressure is restrictively applied to one side of the piston, first by the valve V1, then unrestricted pressure of the same generally low value is applied secondarily to that same side by the valve V5 at the same time at which the valve V7 is thirdly applying propulsion air pressure to the motor B to propel the trolley 38, and finally that same 70 p.s.i. propulsion air pressure is applied by the retracting valve V3 to the opposite side of the piston at the proper time to cause it to retract the wheel post assembly D to non-cutting position. The two-second delay on admitting propulsion air pressure to the propulsion motor B allows the cutter cylinder C to establish full stabilized contact between the wheel post assembly D and the glass 10 prior to starting the trolley in motion.

Figure 14 diagrammatically shows an electrical wiring system controlled by the limit switches LS–1, LS–2, LS–3, and LS–4 in conjunction with the respective coils E of the valves V1, V3, V5, V7, and V9 for automatically controlling the cutter trolley E cutting cylinder. More specifically, the normally closed limit switches LS–1 and LS–2 are arranged to activate a cutting cycle for which electric current is supplied through a pair of spaced conductors 202, 204. LS–1 and LS–2 are held open by the measuring post and closure of the limit switch LS–2 by the raising of the measuring tube 32 as described in connection with Figure 1, thus energizes a relay network 206 to actuate a relay R6 into its displaced position and to energize a time delay relay TDR so as to initiate the time delay period, for instance, the above indicated two seconds in one physically constructed embodiment of the invention. Immediately the reversing relay R6 closes an upper set of holding contacts $a$ which are located in a holding circuit controlled by the limit switch LS–3 forming a reversing switch for the reversing relay R6. The relay R6 further includes lower sets of contacts $b$ and $c$. On the expiration of the two-second time lag, the time delay relay TDR closes its contacts to energize a relay R2 which closes a set of intermediate holding contacts $a$ thereon and simultaneously closes its lower set of contacts $b$. Accordingly, the reversing solenoid valve V9 remains energized in its forward position through a branch conductor 208 leading from the relay network 206 and as it assumes this forward position the relay contacts R6$b$ close to energize the solenoid valve V1 and thereby apply the first stage of pressure to the cutter cylinder C, not shown. Relay contacts R6$c$ simultaneously open to deenergize V3 to vent the retraction air pressure.

After this two-second delay period, the relay R2 also closes its lower sets of contacts $a$ and $b$ so as to apply air pressure to the propulsion motor through the valve V7 and also apply full cutting pressure unrestrictedly to the cutter cylinder C through the valve V5. Accordingly, the cutter carriage operates through the cutting stroke half of its cycle and in getting under way it releases the limit switch LS–4 so as to deenergize the unlocking coil of relay R4. The locking coil of R4 was energized through 206 to open contacts R4$a$ and isolate LS–2 from 206. At the end of the cutting stroke the cutter carriage trips the reversing limit switch LS–3 open to release the holding circuit for the reversing relay R6 which leads through the contacts R6$a$. This action releases the relay R6 which through the contacts R6$b$ deenergizes the cutter cylinder valves V1, V5 and which through the contacts $c$ energizes the retracting solenoid valve V3 so as to retract the cutter. Simultaneously the contacts R6$a$ deenergize the reversing solenoid valve V9 which therefore assumes its reverse drive position to cause the air motor B to drive the cutter trolley 38 through the return stroke half of the cycle. When the cutter trolley 38 reaches the end of its return stroke it trips the switch LS–4 to open circuit the forward relay R2 by energizing the unlocking coil of R4 so as to open the holding circuit which contains the relay contact R2$b$. The operation is then repeated.

In summary, the relay R6 becomes immediately energized at the outset of each cycle and remains so for the cutting stroke part of that cycle and then is dropped out of circuit. The time delay relay TDR has the same operation to accomplish its time lag purposes. The forward relay R2 remains energized for all but the first two seconds of the cutting stroke cycle and for the complete return stroke of the cutter trolley so as to be dropped out of the circuit only upon completion of the return stroke. The contacts of relay R4 are latched in their displaced position at the start of the cycle and provide a means for isolating LS–2 during the cycle, thus permitting LS–3 to control the end-of-cut operations. Contacts R4$b$ form part of the R2 holding circuit which is opened at the end of the cycle when LS–4 is tripped. Relay R4 continues operation independently of the time delay relay TDR which actuated it originally. When the forward relay R4 is deenergized so as to cease operation, it thereby recloses the relay network 206 to prepare the relays R6 and TDR for another cycle which is initiated by the limit switch LS–2. The cycle repeats each time the switch LS–2 is operated by the measuring tube 32.

It is apparent that the components of the cutter trolley unit described in the foregoing Figures 1–14, establish cooperation with one another to very evident advantage. That is to say, the air motor B pivots the friction wheel 112 into propelling position and delivers the driving power thereto whereas the cutter cylinder C slides the cutter wheel 184 under power into cutting position so as to provide for self-sustaining power operation both ways with double action each way on the work-performing wheel element thereof. The rail extension 74 on the monorail 26 not only reinforces that rail against sag and lengthwise deflection, but also eliminates torsional forces thereon and solidly takes the reaction of the cutter cylinder C to maintain it always horizontal. The time delay coaction function which the relay TDR performs in enabling the relay R6 to assume its displaced position two seconds prior to operation of the forward relay R2, makes it possible for the cutter wheel 184 to come into gradually applied contact with the glass under full cutting load before the air motor B starts the wheeled trolley A in its reciprocatory movement. The prior application of this full cutting pressure obviates cutting contact made with a running start after the trolley is in motion and eliminates the tendency for the cutting wheel to bounce and skip as it starts rolling. It is noted that the vertically disposed glass sheet 10 is unsupported over most of its area and as a practical matter the rolls and guide rollers in contact therewith exert line contact only.

If desired, an ordinary pressure switch sensitive to pressure in the cutting air pressure line 192 can be substituted for the time delay relay TDR and given the function of the latter in the second split branch 194 (Figure 13) so as to start forward movement of the cutter trolley 38 only after it senses sufficient pressure build-up of the cutting air. However, the use of the illustrated time delay relay TDR has been found to be very satisfactory and is preferable for that reason.

Variations within the spirit and scope of the invention described are equally comprehended by the foregoing description.

I claim:

1. Cutter carriage structure in a glass cutting machine comprising a track, a concentric trolley surrounding the same and having a plurality of transverse wheel slots therein, and idler and torque transmitting traction wheel means gripping said track on which the pressure of contact of a single traction wheel is held in balance by a substantially equal and opposite clamping force created by at least one of said idler wheel means, said wheel means consisting of trolley rollers of a proportionate number arranged in said plurality of slots to press inwardly on the track in a closely spaced pattern of points.

2. Cutter carriage structure in a glass cutting machine comprising a primarily tubular shaped monorail, a concentric trolley surrounding the same and having plurality of transverse wheel slots therein, and idler and torque transmitting traction wheel means gripping said monorail on which the pressure of contact of a single traction wheel is held in balance by a substantially equal and opposite clamping force created by at least one of said idler wheel means, said wheel means consisting of trolley rollers having their axles fixed crosswise in the slots and holding the rollers therein so as to bear in a conforming pattern upon opposing points on the rail.

3. In a glass cutting machine having a monorail forming a track for the cutter, a trolley for carrying the cutter having a central opening which receives the monorail for guided movement thereupon, an air motor shiftably mounted on the trolley and having a propulsion drive shaft, and means providing a friction drive path from the air motor for propelling the trolley on the monorail including a smooth slippable fiber wheel and a trolley roller coupled thereto and drivingly connected between said shaft and said monorail.

4. In a glass cutting machine having a monorail forming a track for the cutter, a carriage for the cutter arranged with rollers for rolling along the monorail for guiding movement of the cutter thereupon, an air motor pivoted to the trolley and having a propulsion drive shaft, and means providing a slip clutch drive path from the power cylinder to the monorail including friction wheel means fast to said shaft so as to be responsive to pivoting of the air motor for concurrently establishing the slip clutch drive thereof to the monorail.

5. In a glass cutting machine having a monorail forming a cutter track, a trolley for carrying the cutter having a central opening which receives the monorail for guided movement thereupon, an air motor pivoted to the trolley and having a propulsion drive shaft, a friction wheel fast to the drive shaft of the power cylinder and pivoting therewith to a position effective to establish a slip clutch connection from the drive shaft to the rail, and means biasing the air motor to pivot the friction wheel into effectively clutched position under uniformly held pressure.

6. In a glass cutting machine having a monorail forming a cutter track, a trolley frame having a central opening for concentrically receiving the monorail and provided with rollers for rolling thereupon each having an axle, at least one axle including eccentric and non-eccentric portions enabling it to adjust the associated roller, means mounting said one roller axle and the others in a cooperative arrangement whereby rotation of said one axle to adjust the adjustable roller causes the other rollers to bind into a snug relationship therewith against the monorail, propulsion power means pivoted to the trolley frame and including a drive shaft adjacent the adjustable roller, a friction wheel fast to the drive shaft and pivotal therewith to establish an operative traction engagement with the adjustable roller for propelling the trolley on said rail, and means biasing the power means to pivot the friction roller into operative tractive engagement under substantially uniform pressure for all adjusted positions of the adjustable roller.

7. For use on a rail for operative disposition adjacent a body of vertically moving glass sheet, a slip drive cutter with self-propelled action for scoring the latter transversely as it moves across the sheet, comprising in combination, a trolley with an outwardly biased cutting tool thereon and carrying means for rolling the cutter along said rail with the cutting tool positively pressed against said glass sheet, captive power means on said trolley for tractionally driving said cutter with said self-propelled action, means for providing a rotary drive connection between said captive power means and said rail with overload limiting means therein consisting of confronting clutch portions at least one of which is a smooth-faced member and which when engaged establish the traction drive aforesaid from said power means, and means exerting predetermined light biasing pressure on said confronting clutch portions enabling them to automatically slip under higher than normal cutting loads on said cutter.

8. The cutter combination according to claim 7 wherein one of said clutch portions comprises a smooth composition wheel made of nonmetallic material and mounted and operatively coupled to said captive power means at a point enabling the clutch portions to relatively move from their confronting position to their mutually engaged positions under the biasing pressure aforesaid, said means exerting said biasing pressure comprising spring mechanism acting against one of said clutch portions.

9. Cutter trolley structure comprising a trolley, a power cylinder having external means mounting the same to the trolley and containing a hollow piston internally dividing the same into working chambers, said cylinder provided with closure means at the opposite end of said working chambers, a hollow piston rod affixed coaxially to the piston and extending through said closure means at the opposite ends of said working chambers, said rod having a concentric insert carrying a cutter wheel mounted at one end and driven by the coaxial piston into and out of cutting position, and an eccentrically disposed element in said cylinder having a longitudinally extending end for attachment to one of said closure means and extending through the adjacent working chamber and into a companion guide opening leading through the piston in an eccentrically located position.

10. Structure according to claim 9 wherein said eccentric element has a hollow interior, said element being arranged in said closure means with the anchored end thereof communicably connected to a fluid conducting passage in said closure means, and with the opposite end communicating through the piston with the working chamber at the opposite side of the piston to direct a stream of pressure fluid flow between that side of the piston and said fluid conducting passage.

11. Structure according to claim 9 wherein said eccentric element locks the piston fast against rotation about its axis so as to hold the cutter wheel mounting accurately aligned with a fixed cutting plane, said cutter wheel mounting including a swiveled caster-connection having stop means to limit the cutter to a maximum swivel angle of only a few degrees deviation from that fixed cutting plane.

12. Structure according to claim 9 wherein one end of said insert extends beyond the corresponding rear end of the piston rod, and means detachably connecting the insert and the piston rod at the ends just named whereby with detachment and rearward removal of the insert, the cutter wheel mounting carried thereby is withdrawn through the piston rod for open access at the rear end thereof in substituting a cutter wheel in the mounting.

13. Cutter trolley structure comprising a self-propelled trolley having a pair of motors each carrying a rotatable wheel, one of the wheels comprising a cutter wheel and shiftably carried by the associated motor into and out of cutting position, and wheel means on which said trolley is operatively mounted comprising a rail-engaging third wheel carried thereby for rolling along a trolley rail, the wheel on the other motor comprising a friction wheel and being shiftably carried thereby into and out of friction drive position coupled with the third wheel to propel the trolley.

14. Cutter trolley structure comprising a self-propelled trolley having a pair of motors each carrying a rotatable wheel, one wheel comprising a cutter wheel and shiftably carried by the associated motor into and out of its cutting position, the wheel on the other motor comprising a friction wheel and being shiftably carried thereby into and out of friction drive position providing an interruptable power path to propel the trolley, biased support means for mounting said other motor in a manner for normally holding the friction wheel under bias in its friction drive position, and means to lock said other motor with its friction wheel held inoperative against the opposing bias of said support means.

15. Cutter trolley structure comprising a self-propelled trolley having a pair of motors each carrying a rotatable wheel, one wheel comprising a cutter wheel and shiftably carried by the associated motor into and out of its cutting position, the wheel on the other motor comprising a friction wheel and being shiftably carried thereby into and out of friction drive position providing an interruptable power path to propel the trolley, and pretensioned overload limiting mechanism for the latter wheel comprising biased support means mounting said other motor in a manner for normally holding the friction wheel under bias in its friction drive position.

16. In a glass cutting unit having rollers mounting it on a monorail for cut-off movement in a lengthwise direction, a trolley with a central opening to receive said rail and carrying captive power units including an air cylinder and an air motor mounted directly thereto, said power units being transverse to said trolley and vertically displaced in opposite directions from the axis of said monorail with their respective work-performing elements independently connected to reciprocate a cutter into its cutting and inoperative positions laterally to said trolley and to reciprocate the complete unit in the lengthwise direction aforesaid, and flexible hose means forming separate connections for streams of motive air between a common fluid power source and each of said power units for reciprocating said unit and for reciprocating said cutter relative thereto in the described manner during time periods unequal to one another.

17. In a machine for making a transverse cut across a vertically rising sheet of glass, a cage guided for vertical movement alongside the body of the sheet, a combined traction and support rail fixed within said cage, a cutter supported on said combined traction and support rail within said cage and travelling on a trolley thereon in a direction across said sheet, propulsion mechanism carried by said trolley and having an electrical control circuit to operate the same, said control circuit including first and second limit switches on the cage at opposite ends of the cutter travel on said rail to be operated by and to control operation of the trolley at its end points of travel, a forward drive relay controlled by the first limit switch to sustain drive of said mechanism, a reverse drive relay controlled by said second limit switch to reverse said mechanism to propel the trolley rearwardly, and an overload limiting connection comprising a friction drive wheel included in the drive path of said mechanism and having a spin axis capable of limited movement relative to the trolley for driving the trolley in the described directions on the traction and support rail under light load but providing a slip drive connection at all points of trolley travel by freely spinning ineffectively whenever the trolley proceeding along the traction and support rail encounters higher than normal cutting loads.

18. In a machine for making a transverse cut across a vertically rising sheet of glass, a cage guided for vertical movement alongside the body of the sheet, a cutter supported on a combined traction and support rail in said cage and movable on a trolley riding the rail in a direction across said sheet, propulsion mechanism carried by said trolley and having an electrical control circuit to operate the same, said control circuit including first and second limit switches on the cage at opposite ends of the traction and support rail to be operated by and to control operation of the trolley at its end points of travel, means controlled by the first limit switch to sustain operation of said propulsion mechanism and propel the trolley at any time after initial movement, means controlled by said second limit switch to reverse said mechanism to propel the trolley rearwardly, and an overload limiting connection comprising a friction drive wheel included between and operatively urged under predetermined light spring pressure within the drive path between said propulsion mechanism and said traction and support rail and having a spin axis capable of limited movement relative to the trolley and said traction and support rail for driving the trolley thereon in the described directions under light load but providing a slip drive connection at all points of trolley travel by freely spinning ineffectively whenever the trolley proceeding along the traction and support rail encounters higher than normal cutting loads.

References Cited in the file of this patent

UNITED STATES PATENTS

| | | |
|---|---|---|
| 1,988,393 | Oakes | Jan. 15, 1935 |
| 2,208,211 | Crowe | July 16, 1940 |
| 2,334,301 | Young | Nov. 16, 1943 |
| 2,356,877 | Oakes | Aug. 29, 1944 |
| 2,556,757 | Guild | June 12, 1951 |
| 2,571,196 | Bucknam et al. | Oct. 16, 1951 |
| 2,617,644 | Helmkamp | Nov. 11, 1952 |
| 2,650,430 | Klages | Sept. 1, 1953 |
| 2,747,280 | Kurata | May 29, 1956 |

FOREIGN PATENTS

| | | |
|---|---|---|
| 81,077 | Denmark | May 22, 1956 |